3,707,497
SULFONIC ACID CYANOVINYL ESTERS
Reimer Colln, Wuppertal-Elberfeld, and Paul-Ernst Frohberger, Leverkusen, Germany, assignors to Farbenfabriken Bayer Aktiengesellschaft, Leverkusen, Germany
No Drawing. Filed June 26, 1970, Ser. No. 50,332
Claims priority, application Germany, July 11, 1969,
P 19 35 293.3
Int. Cl. C07c 143/68
U.S. Cl. 260—456 R              6 Claims

ABSTRACT OF THE DISCLOSURE

Alkyl, chloroalkyl or phenyl or benzyl (optionally substituted by 1 to 3 halo, lower alkyl and/or nitro substituents) sulfonic acid (optionally chloro) cyanovinyl esters, which possess fungicidal properties and which may be produced by conventional methods.

---

The present invention relates to and has for its objects the provision of particular new alkyl, chloroalkyl, or phenyl or benzyl (optionally substituted by 1 to 3 halo, lower alkyl and/or nitro substituents) sulfonic acid (optionally chloro) cyanovinyl esters, which possess fungicidal properties, active compositions in the form of mixtures of such compounds with solid and liquid disperisble carrier vehicles, and methods for producing such compounds and for using such compounds in a new way especially for combating fungi, with other and further objects becoming apparent from a study of the within specification and accompanying examples.

It is known that fungal plant diseases can be controlled by application of fungicidal chemicals. The known and most used agents include the commercial preparations N-trichloromethylthioltetrahydrophthalimide (A) (A. R. Kittleson: Science 115, 84 (1952)), zinc ethylene-1,2-bisdithiocarbamate (B) (F. W. Heuberger, T. F. Manns: Phytopathology 33, 1113 (1943)) and tetramethylthiouramdisulphide (C) (German patent specification 642,-532 and U.S. patent specification 1,972,961). These fungicides have a broad activity spectrum but nevertheless they are not, or only inadequately effective against numerous phytopathogenic fungi. These deficiencies, of course, restrict their practical usefulness.

It has now been found, in accordance with the present invenion, tha the particular new sulfonic acid cyanovinyl esters of the formula:

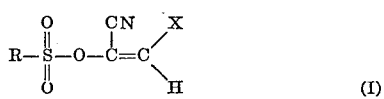

in which

R stands for an alkyl radical with 1 to 6 carbon atoms which may be substituted by 1 to 3 halogen atoms, or for a phenyl or benzyl radical subsituted by 1 to 3 halogen atoms and/or a lower alkyl and/or a nitro group, and X stands for hydrogen or chlorine exhibit strong fungicidal properties.

Preferably, R stands for an alkyl radical with 1 to 3 carbon atoms, such as methyl or ethyl, which may be substituted by preferably 1 to 3 chlorine atoms, or for a phenyl or benzyl radical, which may be substituted by preferably 1 to 3 chlorine atoms and/or a nitro group and/or a methyl group.

It has been furthermore found, in accordance with the present invention, that a process for the production of the compounds of Formula I above may be provided, which comprises reacting a sulfonic acid halide of the formula:

in which

R is the same as defined above, and
Hal stands for chlorine or bromine, with the cyanohydrin of a chlorinated acetaldehyde of the formula:

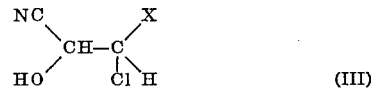

in the presence of an acid-binding agent.

Surprisingly, the particular new sulfonic acid cyanovinyl esters according to the present invention, like the above-mentioned known fungicides, have a broad fungitoxic activity spectrum but with the advantage that in many cases their degree of activity is higher with the same application concentration. They therefore have advantages over the agents known from the prior art. This is particularly true in seed dressings and soil treatment agents. In the concentrations necessary for the control of phytopathogenic fungi they do not damage the cultivated plants. The following attributes facilitate their handling by humans: they have only a low toxicity to warm-blooded animals, they have only a faint odor and have no deleterious effect on human skin. They are therefore suitable for practical use as crop protection agents and thus represent a valuable enrichment of the art.

If methanesulfonic acid chloride and monochloroacetaldehyde-cyanohydrin are used as starting materials, the reaction course can be represented by the following formula scheme:

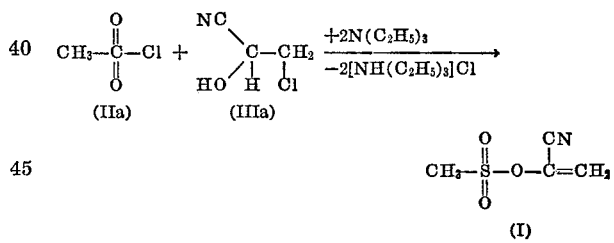

The sulfonic acid halides to be used as starting materials are defined generally by the formula II above.

As examples of these sulfonic acid halides there may be mentioned in particular: methane-, chloromethane-, dichloromethane-, trichloromethane-, ethane-, 1-chloroethane-, 1,1-dichloroethane-, propane-, 1-chloropropane-, 1,1-dichloropropane-, 1,1,3-trichloropropane-, 3-chloropropane-, 3,3-dichloropropane-, 3,3,3-trichloropropane-, 1,3,3 - trichloropropane-, isopropane-, chloroisopropane-, butane-, chlorobutane, dichlorobutane-, trichlorobutane-, isobutane-, chloroisobutane-, dichloroisobutane-, trichloroisobutane-, pentane-, hexane-, 4-chloro-benzene-, 3, 4-dichlorobenzene-, 2,4,5-trichlorobenzene, 4-methyl-benzene-, 2-methylbenzene-, 4-nitrobenzene-, 2-nitrobenzene-, 3-methyl-4-nitrobenzene-, 3 - chloro - 4 - nitrobenzene-, benzyl-, 4 - chlorobenzyl-, 3,4 - dichlorobenzyl-, 4 - nitrobenzyl- and 3-chloro-4-nitrobenzyl-sulfonic acid chloride or bromide.

The sulfonic acid halides are, in general, known compounds.

The cyanohydrins of chlorinated acetaldehydes to be used as starting materials are clearly defined by Formula III above. Monochloroacetaldehyde-cyanohydrin is known (Berichte der Deutschen Chemischen Gesellschaft 59, 2400 (1926)). Dichloroacetaldehyde-cyanohydrin, on the other hand, has not yet been described; it can, however, be obtained in manner known in principle by reaction of dichloroacetaldehyde with hydrogen cyanide.

The reaction according to the present invention may be carried out in the presence of a diluent, for example water or any inert organic solvent. Preferred organic solvents include hydrocarbons, such as benzine, benzene and toluene. In one method of carrying out the reaction, a two-phase solvent mixture is used, such as a water/benzene or a water/toluene mixture.

The acid binding agent used in the process of the invention may be any of the usual acid-binding agents. Preferred examples include alkali metal hydroxides, alkali metal carbonates and tertiary amines, such as triethylamine, pyridine, and the like. Especially suitable substances include sodium carbonate or sodium hydroxide in aqueous solution and triethylamine dissolved in an aromatic hydrocarbon.

The reaction temperatures can be varied within a fairly wide range. In general, the reaction is carried out at substantially between about $-10$ to $+70°$ C., preferably at between about 0 to 50° C.

When carrying out the production process according to the invention, one mol of cyanohydrin and two mols of an acid-burning agent are generally used for each mol of sulfonic acid halide.

The reaction products may be isolated by separating, washing neutral, drying and freeing the organic phase from the solvent under reduced pressure.

The active compounds according to the present invention exhibit a strong fungitoxic activity and can be used as crop protection agents, particularly for soil treatment, for seed treatment and for the treatment of above-the-soil parts of plants. They are effective, especially, against *Sclerotium rolfsii, Schlerotinia sclerotiorum, Verticillium alboatrum, Thielaviopsis basicola, Phytophthora cactorum, Fusarium culmorum, Fusarium oxysporum, Fusarium solani, Fusarium nivale, Rhizoctonia solani, Pythium ultimum* and *Tilletia caries.*

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, oils, pastes, soluble powders, dusting agents, granules, tablets, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents and nonsolvents, such as aromatic hydrocarbons (e.g. benzene, toluene, xylene, dimethyl naphthalene, aromatic naphthas, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, diatomaceous earth, clay, montmorillonite, etc.), and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying or wetting agents, such as non-ionic and/or anionic emulsifying or wetting agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially other plant protection agents, such as other fungicides, or herbicides, growth substances, plant nutrients, soil structure improvement agents, insecticides, acaricides, nematocides, bactericides, etc., including, especially fungicidal, organo-phosphorus compounds, carbamate compounds, dithiocarbamate compounds, chlorine compounds, dinitro compounds, organic sulfur or copper compounds, substituted phenoxy compounds, chlorophenols, substituted diphenyl ethers, anilide compounds, ureas, triazines, antibiotics, and other known agricultural chemicals and/or fertilizers, if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.001–10%, preferably 0.01–5%, by weight of the mixture. Thus, the present invention contemplates over-all compositions which comprise mixtures of a conventional dispersible carrier vehicle such as (1) a dispersible inert finely divided carrier solid, and/or (2) a dispersible liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally about 0.001–95%, and preferably 0.01–95%, by weight of the mixture.

When they are used as leaf fungicides, the concentrations of the active compounds in the application forms can be varied within a fairly wide range. In general, they are from 0.5 to 0.0005, preferably 0.2 to 0.001, percent by weight.

In the case of seed treatment, there are required, in general, amounts of active compound of 0.01 to 50 g., preferably 0.5 to 5 g., per kilogram of seed.

For soil treatment, amounts of active compound of 1 to 1000 g., preferably of 10 to 200 g. per cubic metre of soil are generally necessary.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns; or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound, or even the 100% active substance alone, e.g. about 20–100% by weight of the active compound.

In particular, the present invention contemplates methods of selectively killing, combating or controlling fungi, which comprise applying to at least one of (a) such fungi and (b) their habitat, i.e. the locus to be protected, a fungicidally effective or toxic amount of the particular active compound of the invention alone or together with a carrier vehicle as noted above. The instant formulations or compositions are applied in the usual manner, for instance by spraying, squirting, atomizing, vaporizing, scattering, dusting, watering, sprinkling, pouring dry dressing, paste dressing, wet dressing, moist dressing, via incrustation; and the like.

Significantly, the fungicidal compositions of the present invention can be applied for example by spraying a dust formulation directly onto stems and leaves of plants; or by using the formulation as a seed-dressing; by spraying an emulsifiable concentrate, diluted with water, etc. to a desirable concentration, onto stems and leaves of plants; by suspending a wettable powder in water at a desirable concentration and spraying the formulation onto stems and leaves of plants; by applying granule formulations to the soil; and the like.

It will be realized, of course, that the concentration of the particular active compound utilized in admixture with the carrier vehicle will depend upon the intended application, the purpose for which the active compound is used, To produce a suitable preparation of the particular active compound, 1 part by weight of the active compound is taken up in the stated amount of solvent.

The preparation of the given active compound is added to potato dextrose agar (which has been liquefied by heating) in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated on to it in small discs of 5 mm. diameter. The Petri dishes remain at 20° C. for 3 days for incubation.

After this time, the inhibiting action of the active compound on the mycelium growth is determined in categories, taking into account the untreated control. 0 means no mycelium growth, either on the treated substrate or on the inoculum; the symbol — means mycelium growth on the inoculum only, no spread to the treated substrate; and the symbol + means mycelium growth from the inoculum on to the treated substrate, similar to the spread to the untreated substrate of the control.

The particular active compounds, their concentrations, the test fungi and the inhibition effects achieved can be seen from the following Table 1. The active compound numbers correspond to the compounds used in each of the tests and are taken from the numbers adjacent to the formula of each compound in each of the respective examples.

TABLE 1.—AGAR PLATE TEST

| Active Compound No. and/or name | Concentration of active compound in substrate in p.p.m. | Corticium rolfsii | Sclerotinia sclerotiorum | Verticillium alboatrum | Thielaviopsis basicola | Phytophthora cactorum | Fusarium culmorum | Fusarium oxysporum | Fusarium solani f. pisi |
|---|---|---|---|---|---|---|---|---|---|
| Untreated | | + | + | + | + | + | + | + | + |
| (B) Zinc-ethylene-1,2-bis dithiocarbamate (known) | 10 (a) | + | + | + | + | | + | + | + |
| | 100 (b) | + | + | 0 | 0 | | + | + | + |
| (3) | 10 (a) | 0 | 0 | + | 0 | 0 | 0 | + | + |
| | 100 (b) | 0 | 0 | 0 | 0 | 0 | 0 | 0 | 0 |
| (4) | 10 (a) | 0 | 0 | 0 | 0 | 0 | 0 | 0 | 0 |
| | 100 (b) | 0 | 0 | 0 | 0 | 0 | 0 | 0 | 0 |
| (5) | 10 (a) | 0 | — | — | 0 | — | + | + | + |
| | 100 (b) | 0 | 0 | 0 | 0 | 0 | 0 | 0 | 0 |
| (6) | 10 (a) | 0 | 0 | 0 | — | 0 | 0 | 0 | + |
| | 100 (b) | 0 | 0 | 0 | 0 | 0 | 0 | 0 | 0 |
| (7) | 10 (a) | 0 | 0 | 0 | — | — | + | + | + |
| | 100 (b) | 0 | 0 | 0 | 0 | 0 | 0 | 0 | 0 |
| (8) | 10 (a) | 0 | 0 | 0 | — | 0 | + | + | + |
| | 100 (b) | 0 | 0 | 0 | 0 | 0 | 0 | 0 | 0 |
| (9) | 10 (a) | 0 | 0 | + | — | — | + | + | + |
| | 100 (b) | 0 | 0 | 0 | 0 | 0 | 0 | 0 | 0 |
| (10) | 10 (a) | 0 | 0 | + | — | 0 | + | + | + |
| | 100 (b) | 0 | 0 | 0 | 0 | 0 | 0 | 0 | 0 |
| (11) | 10(a) | 0 | 0 | 0 | 0 | 0 | — | 0 | + |
| | 100 (b) | 0 | 0 | 0 | 0 | 0 | 0 | 0 | 0 |
| (13) | 10 (a) | 0 | 0 | + | 0 | 0 | + | 0 | + |
| | 100 (b) | 0 | 0 | 0 | 0 | 0 | 0 | 0 | 0 |
| (14) | 10 (a) | 0 | 0 | 0 | 0 | 0 | 0 | 0 | + |
| | 100 (b) | 0 | 0 | 0 | 0 | 0 | 0 | 0 | 0 |
| (16) | 10 (a) | 0 | 0 | 0 | 0 | 0 | 0 | 0 | 0 |
| | 100 (b) | 0 | 0 | 0 | 0 | 0 | 0 | 0 | 0 |
| (17) | 10 (a) | 0 | 0 | + | — | 0 | + | 0 | + |
| | 100 (b) | 0 | 0 | 0 | 0 | 0 | 0 | 0 | 0 |
| (18) | 10 (a) | 0 | 0 | 0 | — | — | + | 0 | + |
| | 100 (b) | 0 | 0 | 0 | 0 | 0 | 0 | 0 | 0 |
| (19) | 10 (a) | 0 | 0 | + | — | — | + | + | + |
| | 100 (b) | 0 | 0 | 0 | 0 | 0 | 0 | 0 | 0 | and the like. Therefore, in special cases, it is possible to go above or below the aforementioned concentration ranges and dosage amounts per unit area.

The fungicidal effectiveness of the particular new compounds of the present invention is illustrated, without limitation, by the following examples:

EXAMPLE 1

Agar plate test

Test for fungitoxic effectiveness and breadth of the activity spectrum:

Solvent: acetone
Parts by weight:
 (a) 1000
 (b) 100

EXAMPLE 2

Seed dressing test/bunt of wheat (seed-born mycosis)

To produce a suitable dry dressing, the particular active compound is extended with a mixture of equal parts by weight of talc and kieselguhr to give a finely powdered mixture with the desired concentration of the given active compound.

Wheat seed is contaminated with 5 g. of the chlamydospores of tilletia caries per kg. of seed. To apply the dressing, the seed is shaken with the dressing in a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller the number of spores which have germinated, the more effective is the active compound.

The particular active compounds, the concentrations of the active compounds in the dressing, the amounts of dressing used and the percentage spore germination can be seen from the following Table 2.

TABLE 2.—SEED DRESSING TEST/BUNT OF WHEAT

| Active Compound No. and/or name | Concentration of active compound in dressing [1] | Applied amount of dressing in g./kg. seed | Spore germination in percent |
|---|---|---|---|
| Non-dressed | | | 10 |
| (B) Zinc-ethylene-1,2-bis-dithiocarbamate (known) | 10 | 1 | 5 |
| (1) | 10 | 1 | 0.000 |
|  | 30 | 1 | 0.000 |
| (2) | 3 | 1 | 0.005 |
|  | 10 | 1 | 0.000 |
|  | 30 | 1 | 0.000 |
| (3) | 30 | 1 | 0.000 |
| (4) | 10 | 1 | 0.05 |
|  | 30 | 1 | 0.000 |
| (5) | 10 | 1 | 0.005 |
|  | 30 | 1 | 0.000 |
| (6) | 3 | 1 | 0.05 |
|  | 10 | 1 | 0.000 |
|  | 30 | 1 | 0.000 |
| (7) | 3 | 1 | 0.05 |
|  | 10 | 1 | 0.000 |
|  | 30 | 1 | 0.000 |
| (8) | 3 | 1 | 0.05 |
|  | 10 | 1 | 0.000 |
|  | 30 | 1 | 0.000 |
| (9) | 3 | 1 | 0.05 |
|  | 10 | 1 | 0.005 |
|  | 30 | 1 | 0.000 |
| (10) | 3 | 1 | 0.05 |
|  | 10 | 1 | 0.000 |
|  | 30 | 1 | 0.000 |
| (11) | 3 | 1 | 0.05 |
|  | 10 | 1 | 0.005 |
|  | 30 | 1 | 0.000 |
| (12) | 10 | 1 | 0.000 |
|  | 30 | 1 | 0.000 |
| (13) | 10 | 1 | 0.05 |
|  | 30 | 1 | 0.000 |
| (14) | 10 | 1 | 0.05 |
|  | 30 | 1 | 0.000 |
| (15) | 30 | 1 | 0.000 |
| (16) | 10 | 1 | 0.005 |
|  | 30 | 1 | 0.000 |
| (17) | 30 | 1 | 0.000 |
| (18) | 10 | 1 | 0.05 |
|  | 30 | 1 | 0.005 |
| (19) | 10 | 1 | 0.005 |
|  | 30 | 1 | 0.000 |

[1] In percent by weight.

EXAMPLE 3

Seed dressing test/snow mould (seed-born mycosis)

To produce a suitable dry dressing, the particular active compound is extended with a mixture of equal parts by weight of talc and kieselguhr to give a finely powdered mixture with the desired concentration of active compound.

To apply the dressing, rye seed, which is naturally infested by *Fusarium nivale,* is shaken with the dressing in a closed glass flask. Two batches of 100 grains of this seed are sown 1 cm. deep in seed boxes containing Fruhstorfer standard soil. The young plants develop in climatic chambers at 10° C., at a relative atmospheric humidity of 95% and in diffused natural light; they show the typical symptoms of snow mould within the first 3 weeks.

After this time, the number of Fusarium-infested plants is determined as a percentage of the total number of emerged plants. The smaller the number of diseased plants, the more effective is the active compound.

The particular active compounds, the concentrations of the active compounds in the dressing, the amounts of dressing used and the number of diseased plants can be seen from the following Table 3.

TABLE 3.—SEED DRESSING TEST/SNOW MOULD

| Active Compound No. and/or name | Concentration of active compound in dressing in percent | Amount applied of dressing in g./kg. seed | Number of Fusarium-infected plants [1] as a percentage of the total number of emerged plants |
|---|---|---|---|
| Non-dressed | | | 14.4 |
| (B) Zinc-ethylene-1,2-bisdithiocarbamate (known) | 30 | 2 | 9.1 |
|  | 75 | 2 | 7.3 |
| (2) | 3 | 2 | 0.0 |
|  | 10 | 2 | 0.0 |
|  | 30 | 2 | 0.0 |
| (9) | 30 | 2 | 4.8 |
| (11) | 30 | 2 | 0.0 |
| (15) | 30 | 2 | 2.9 |

[1] As a percentage of the total number of emerged plants.

EXAMPLE 4

Soil treating agent test/soil-born mycoses

To produce a suitable preparation of the particular active compound, the given active compound is extended with talc to a content of 5% and subsequently with quartz sand to a content of 0.5% of active compound.

The preparation of the active compound is uniformly mixed with Fruhstorfer standard soil, which has first been sterilized and then inoculated with pure cultures of the test fungi.

The soil is filled into 5 pots, each of which is sown with 10 seeds of the host plants. The pots are placed in a greenhouse at the stated temperatures and kept normally moist.

3 weeks after sowing, the number of healthy plants is determined as a percentage of the number of seeds sown. 0% means that no healthy plants have grown; 100% means that healthy plants have resulted from all the seeds.

The particular active compounds, the concentrations of the active compounds in the soil, the test fungi, host plants, greenhouse temperatures and the results obtained can be seen from the following Table 4.

TABLE 4.—SOIL TREATING AGENT TEST/SOIL-BORN MYCOSES

| | | Test fungi | | | | |
|---|---|---|---|---|---|---|
| | | Rhizoct. solani | Fusarium culmorum | Verticill. alboatrum | Corticium rolfsii | Thielaviopsis basicola |
| | | Host plant | | | | |
| | | Pea | Pea | Pea | Pea | Cotton |
| | Concentration of active compound in mg./liter soil | Temperature range,° | | | | |
| Active Compound No. and/or name | | 18–22 | 22–25 | 22–25 | 22–25 | 22–25 |
| | | Number of healthy plants in percent | | | | |
| Fruhstorfer standard soil, sterilized untreated | | 96 | 94 | 96 | 84 | 84 |
| Fruhstorfer standard soil, sterilized and inoculated untreated | | 0 | 14 | 0 | 24 | 0 |
| (A) N-trichloromethylthiotretrahydrophthalimide (known) | 10 | 16 | 10 | | 6 | 22 |
| | 25 | | 14 | 20 | 22 | 32 |
| | 50 | 18 | | 28 | | |
| | 100 | 24 | 34 | 38 | 40 | 46 |
| (C) Tetramethylthiouramdisulphide (known) | 10 | 6 | 8 | | 2 | 2 |
| | 25 | | | | | |
| | 50 | 16 | 16 | 18 | 22 | 6 |
| | 100 | 26 | 42 | 22 | 30 | 6 |

TABLE 4—Continued

| Active Compound No. and/or name | Concentration of active compound in mg./liter soil | Rhizoct. solani | Fusarium culmorum | Verticill. alboatrum | Corticium rolfsii | Thielaviopsis basicola |
|---|---|---|---|---|---|---|
| | | Pea | Pea | Pea | Pea | Cotton |
| | | 18–22 | 22–25 | 22–25 | 22–25 | 22–25 |
| | | Number of healthy plants in percent | | | | |
| (B) Zinc-ethylene-1,2-bis-dithiocarbamate (known) | 10 | 0 | | 8 | | 0 |
| | 25 | | 2 | 6 | 0 | 0 |
| | 50 | 0 | | 24 | 0 | 0 |
| | 100 | 2 | 2 | | 4 | 0 |
| (2) | 10 | | | 66 | | |
| | 25 | 76 | 70 | | | |
| | 50 | 98 | 70 | | | |
| | 100 | 100 | | | | |
| (3) | 5 | | | 38 | | |
| (4) | 25 | 54 | 70 | 94 | 72 | 86 |
| (5) | 100 | | 40 | | | |
| (6) | 25 | | | | 68 | 62 |
| (7) | 100 | 36 | 62 | | 64 | 36 |
| (8) | 25 | | | | 38 | 44 |
| (9) | 25 | | | | 78 | |
| (10) | 25 | | | 54 | 78 | 42 |
| | 2.5 | | | | | 2 |
| | 5 | | 40 | 32 | 70 | 54 |
| (11) | 10 | 48 | 66 | 66 | | 82 |
| | 25 | | | 92 | 86 | 78 | 92 |
| | 50 | 88 | | 94 | | |
| | 100 | 94 | | | 92 | |
| (12) | 25 | 62 | | | | |
| | 50 | 88 | | 94 | | |
| (13) | 25 | | 64 | 68 | 68 | 84 |
| (14) | 25 | | 42 | 88 | 80 | 80 |
| (16) | 25 | | | | 32 | 74 |
| (17) | 25 | | | | 44 | |
| (18) | 25 | | | | | 44 |
| (19) | 25 | | | 34 | 70 | 44 |

EXAMPLE 5

Soil treating agent test/*Pythium ultimum*

To produce a suitable preparation of the active compound, the active compound is extended with talc to a content of 5% and subsequently with quartz sand to a content of 0.5% of active compound.

The preparation of the active compound is uniformly mixed with naturally infected compost soil which, when sown with wrinkled canning peas, is known from experience to lead to high losses among the seedlings through *Pythium ultimum*. The soil is filled into 5 pots, each of which is sown with 10 seeds of the wrinkled canning pea. The pots are placed in a greenhouse at 15–18° and kept normally moist.

3 weeks after sowing, the number of healthy plants is determined as a percentage of the number of seeds sown. 0% means that no healthy plant has grown; 100% means that healthy plants have resulted from all the seeds.

The particular active compounds, the concentrations of the active compounds in the soil, and the results obtained can be seen from the following Table 5.

TABLE 5.—SOIL TREATING AGENT TEST/*PYTHIUM ULTIMUM*

| Active Compound No. and/or name | Concentration of active compound in mg./liter soil | Number of healthy plants in percent |
|---|---|---|
| Untreated | | 2 |
| (C) Tetramethylthiouramdisulphide (known) | 10 | 4 |
| | 25 | 8 |
| | 50 | 24 |
| | 100 | 62 |
| (B) Zinc-ethylene-1,2-bis-dithiocarbamate (known) | 10 | 6 |
| | 50 | 6 |
| | 100 | 16 |
| (3) | 5 | 50 |
| (4) | 25 | 90 |
| (7) | 100 | 30 |
| (10) | 25 | 48 |
| | 5 | 58 |
| (11) | 25 | 80 |
| | 50 | 90 |
| (13) | 25 | 62 |
| (14) | 25 | 92 |

The following further examples illustrate, without limitation, the process for producing the particular new compounds of the present invention.

EXAMPLE 6

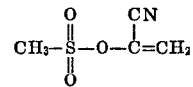

(1)

To a mixture of 42.2 g. (0.4 mol) of monochloroacetaldehydecyanohydrin, 400 ml. toluene and 45.7 g. (0.4 mol) methanesulfonic acid chloride there is added dropwise at an internal temperature of 15° C., with stirring and external cooling, a solution of 85.0 g. (0.84 mol) triethylamine in 80 ml. toluene. The mixture is allowed to continue to react for two hours at 25° C., and the salt formed is then removed by filtration. The filtrate, after being washed three times with water, is freed from solvent by evaporation under reduced pressure. After vacuum distillation of the residue, there are obtained 41.0 g. of a colorless liquid of the boiling point 82° C./2 mm. Hg with the refractive index $n_D^{23} = 1.4524$ (yield: 70% of the theory).

EXAMPLE 7

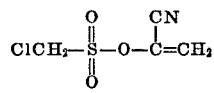

(2)

With the same method of working as in Example 6, from 31.7 g. (0.3 mol) monochloroacetaldehyde-cyanohydrin, 44.7 g. (0.3 mol) chloromethanesulfonic acid chloride and 63.0 g. (0.62 mol) triethylamine there are obtained 44.1 g. of a colorless liquid of the boiling point 73° C./0.01 mm. Hg with the refractive index $n_D^{20} = 1.4762$ (yield: 81% of the theory).

EXAMPLE 8

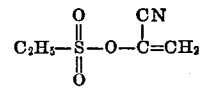

(3)

The above compound is obtained according to the particulars given in Example 6 and is a colorless liquid of the boiling point 92° C./2 mm. Hg and the refractive index $n_D^{26} = 1.4519$.

EXAMPLE 9

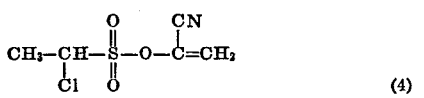
(4)

The above compound is obtained according to the particulars given in Example 6 and is a colorless liquid of the boiling point 100° C./mm. Hg and the refractive index $n_D^{21}=1.4695$.

EXAMPLE 10

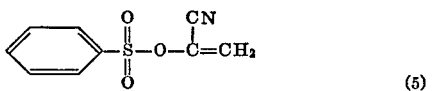
(5)

The above compound is obtained according to the particulars given in Example 6 and is a colorless liquid of the boiling point 91° C./0.1 mm. Hg and the refractive index $n_D^{23}=1.5243$.

EXAMPLE 11

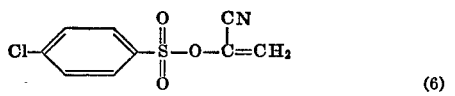
(6)

The above compound is obtained according to the particulars given in Example 6 and is in the form of colorless crystals of the melting point 42° C.

EXAMPLE 12

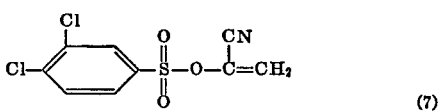
(7)

The above compound is obtained according to the particulars given in Example 6 and is in the form of colorless crystals of the melting point 88° C.

EXAMPLE 13

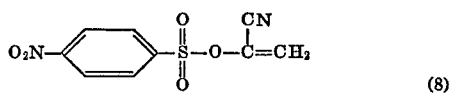
(8)

The above compound is obtained according to the particulars given in Example 6 and is in the form of yellow crystals of the melting point 84° C.

EXAMPLE 14

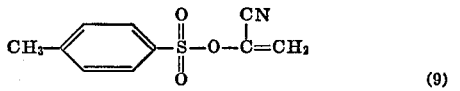
(9)

The above compound is obtained according to the particulars given in Example 6 and is in the form of colorless crystals of the melting point 37° C. and of the boiling point 110° C./0.01 mm. Hg.

EXAMPLE 15

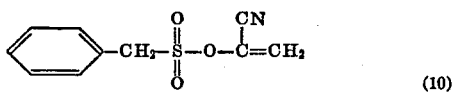
(10)

The above compound is obtained according to the particulars given in Example 6 and is in the form of colorless crystals of the melting point 29° C.

EXAMPLE 16

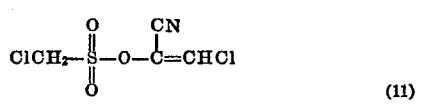
(11)

To a mixture of 42.0 g. (0.3 mol) dichloroacetaldehydecyanohydrin, 300 ml. toluene and 44.7 g. (0.3 mol) chloromethanesulfonic acid chloride there is added dropwise at an internal temperature of 10° C., with stirring and external cooling, a solution of 60.6 g. (0.6 mol) triethylamine in 60 ml. toluene. After two to three hours' continued reaction at 25° C., the salt formed is filtered off and the filtrate is washed three times with water. After drying with sodium sulfate, the solvent is removed under reduced pressure. After vacuum distillation of the residue, there are obtained 50.5 g. (78% of the theory) of a colorless liquid of the boiling point 86° C./0.1 mm. Hg with the refractive index $n_D^{21}=1.5041$.

The dichloroacetaldehydecyanohydrin required as initial product in the above example is obtained in manner known in principle by reaction of dichloroacetaldehyde with hydrogen cyanide and is a colorless liquid of the boiling point 82° C./2 mm. Hg and of the refractive index $n_D^{21}=1.4810$.

EXAMPLE 17

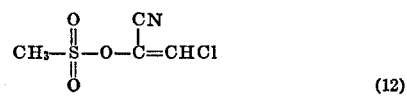
(12)

The above compound is obtained according to the particulars given in Example 16 and is a colorless liquid of the boiling point 71° C./0.01 mm. Hg and of the refractive index $n_D^{18}=1.4882$.

EXAMPLE 18

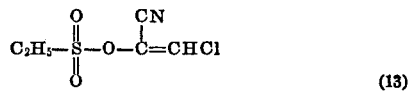
(13)

The above compound is obtained according to the particulars given in Example 16 and is a colorless liquid of the boiling point 108° C./2 mm. Hg and the refractive index $n_D^{21}=1.4802$.

EXAMPLE 19

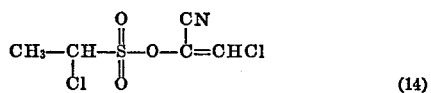
(14)

The above compound is obtained according to the particulars given in Example 16 and is a colorless liquid of the boiling point 115° C./2 mm. Hg and the refractive index $n_D^{21}=1.4940$.

EXAMPLE 20

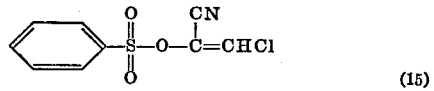
(15)

The above compound is obtained according to the particulars given in Example 16 and is a colorless liquid of the boiling point 112° C./0.01 mm. Hg and the refractive index $n_D^{21}=1.5428$.

EXAMPLE 21

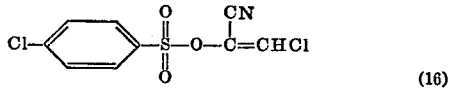
(16)

The above compound is obtained according to the particulars given in Example 16 and is in the form of colorless crystals of the melting point 81-82° C.

EXAMPLE 22

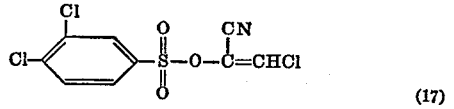
(17)

The above compound is obtained according to the particulars given in Example 16 and is in the form of colorless crystals of the melting point 75-77° C.

EXAMPLE 23

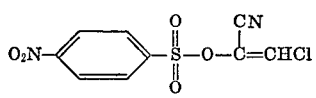
(18)

The above compound is obtained according to the particulars given in Example 16 and is in the form of yellow crystals of the melting point 78–79° C.

EXAMPLE 24

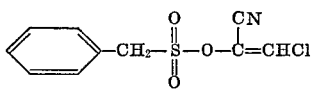
(19)

The above compound is obtained according to the particulars given in Example 16 and is in the form of colorless crystals of the melting point 63–64° C.

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity enabling such compounds to be used with correspondingly favorable compatibility with warm-blooded creatures and plants for more effective control and/or elimination of fungi by application of such compounds to such fungi and/or their habitat.

It will be apprecitaed that the instant specification and examples are set forth by way of illustration and not limitation, and that various modifications and changes may be made without departing from the spirit and scope of the present invention.

What is claimed is:

1. Sulfonic acid cyanovinyl esters of the formula

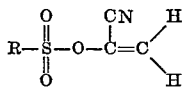

in which R stands for methyl, ethyl, chloromethyl, 1-chloroethyl or phenyl.

2. Compound according to claim 1 wherein such compound is methylsulfonic acid cyanovinyl ester of the formula:

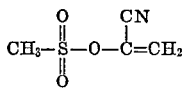

3. Compound according to claim 1 wherein such compound is chloromethylsulfonic acid cyanovinyl ester of the formula:

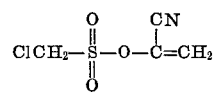

4. Compound according to claim 1 wherein such compound is ethylsulfonic acid cyanovinyl ester of the formula:

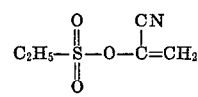

5. Compound according to claim 1 wherein such compound is 1-chloroethylsulfonic acid cyanovinyl ester of the formula:

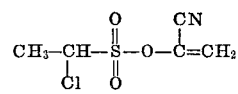

6. Compound according to claim 1 wherein such compound is phenylsulfonic acid cyanovinyl ester of the formula:

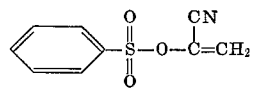

References Cited

UNITED STATES PATENTS 3,052,707   9/1962   Wilson _____ 260—456 R

OTHER REFERENCES

Yakubovich et al. "Cyanoalkylsulfonates," J. Org. Chem. U.S.S.R., 2, 609–611 (1966).

Chem. Abstracts, vol. 65 4574(a) (1966).

LEON ZITVER, Primary Examiner

L. B. DeCRESCENTE, Assistant Examiner

U.S. Cl. X.R.

424—303